Figure 1:
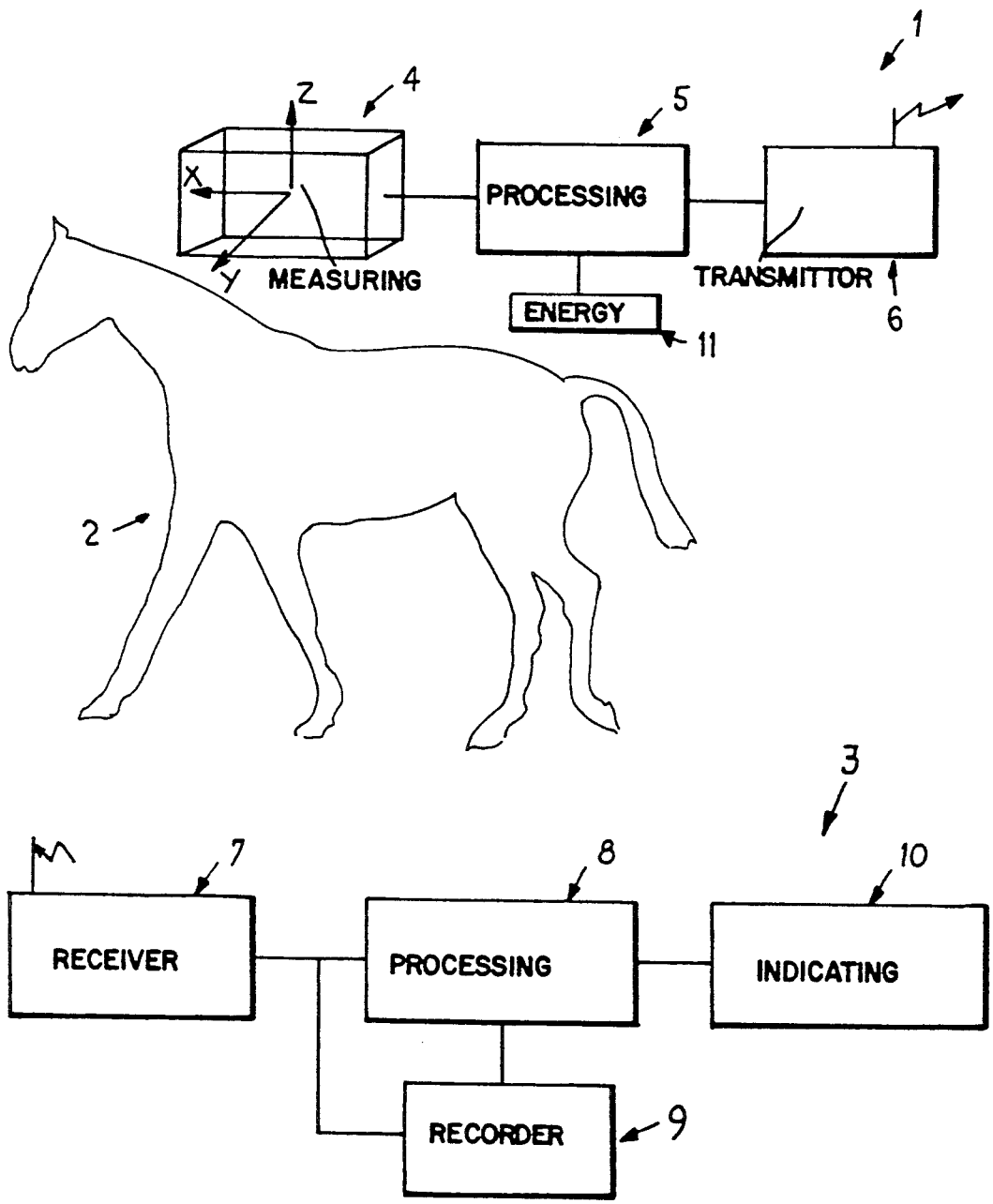

United States Patent [19]
Abraham et al.

[11] Patent Number: 5,138,550
[45] Date of Patent: Aug. 11, 1992

[54] DEVICE FOR MONITORING THE GAIT IN PARTICULAR OF A HORSE AND MONITORING SYSTEM TO WHICH IT IS APPLIED

[75] Inventors: Raymond Abraham, Caudebec les Elboeuf; Gilbert Blottiere, Broglie; Jean-Pierre Moreau, Ollioules; Benoit Rubben, La Ciotat; Claude Tanquerel, Le Trait, all of France

[73] Assignee: P.O. Ingenierie, Le Seyne S/Mer, France

[21] Appl. No.: 472,779

[22] Filed: Jan. 31, 1990

[30] Foreign Application Priority Data

Jan. 31, 1989 [FR] France ............................ 89 01192

[51] Int. Cl.$^5$ ............... G06F 15/28; G08B 23/00; A63K 1/00; G09B 19/00
[52] U.S. Cl. ................. 364/410; 340/323 R; 434/237; 119/29; 472/86
[58] Field of Search ................. 364/410; 340/323 R; 273/1 GE; 272/5; 434/237; 119/29

[56] References Cited

U.S. PATENT DOCUMENTS

| | | | |
|---|---|---|---|
| 3,795,907 | 3/1974 | Edwards | 340/323 |
| 3,999,611 | 12/1976 | Bucalo | 168/4 |
| 4,190,968 | 3/1980 | Clapp et al. | 35/29 R |
| 4,499,394 | 2/1985 | Koal | 310/330 |
| 4,619,222 | 10/1986 | Sundberg et al. | 272/5 |
| 4,774,679 | 9/1988 | Carlin | 119/29 |

Primary Examiner—Dale M. Shaw
Assistant Examiner—Xuong Chung
Attorney, Agent, or Firm—Sherman and Shalloway

[57] ABSTRACT

A device for monitoring the gait of a horse comprises a device (4) for measuring displacement parameters of the horse (2) along at least one axis (Z), processing device (5, 8) for processing the signals coming from the measuring device (4), microprocessor for comparing the amplitude of the output signals from the processing device means with at least one given value characterizing a gait error of the horse (2), and a device (10) for indicating a gait error.

11 Claims, 2 Drawing Sheets

DEVICE FOR MONITORING THE GAIT IN PARTICULAR OF A HORSE AND MONITORING SYSTEM TO WHICH IT IS APPLIED

The present invention relates to a device for monitoring the gait in particular of a horse and to a system for monitoring, for example, horses during a race, to which it is applied.

Races in which competitors are bunched together, and in particular trotting races, are extremely difficult to monitor, with the result that errors of judgement concerning the faulting of the horses may be committed.

Indeed, it is extremely difficult for the race stewards to be able to follow several horses at the same time and establish with certainty whether a horse has made a mistake or not, inasmuch as they do not have at their disposal any completely reliable means enabling confirmation of their decision. Of course, there exist closed-circuit television systems comprising cameras, television receivers and video recorders, which enable the stewards to monitor certain horses.

However, these systems are not totally reliable inasmuch as the horses may make a mistake off camera.

Besides this, systems for determining the movements of a horse are also known in the state of the art.

Thus, for example, there exist systems comprising accelerometers or inertial units for the acquisition of displacement parameters of a horse, these systems having been developed, for example, within the context of the production of an equestrian simulator and the creation of data banks of movements of a certain number of specially selected horses.

The object of the invention is therefore to solve the problems mentioned above in respect of horse racing by proposing a device and a system for monitoring the gait in particular of horses during a race, which are reliable, simple and of low cost price and which form a system for assisting the race stewards with their decisions.

To this end, the subject of the invention is a device for monitoring the gait in particular of a horse, characterized in that it comprises:

means for measuring displacement parameters of the horse along at least one axis, means for processing the signals coming from the measuring means, means for comparing the amplitude of the output signals from the processing means with at least one given value characterizing a gait error of the horse, and means for indicating a gait error.

Advantageously, the processing means possess first means for selecting signals from a first frequency range of the parameters coming from the measuring means in order to determine a change of gait of the horse.

Advantageously also, the said axis is a vertical axis and the first frequency range ranges from 1.5 to 2.5 Hz.

Advantageously also, the measuring means are arranged in a first unit carried by the horse and additionally comprising independent means for supplying electrical energy to the circuits of this first unit and means for transmitting data to means for receiving these data, provided in a second unit separated from the first and in which the error-indicating means are arranged.

From another point of view, a further subject of the invention is a system for monitoring horses during a race, characterized in that the gait of each horse is monitored by means of a device as described above, each of the devices transmitting on a separate frequency.

Advantageously, the second units of each of the devices are grouped together in a common unit comprising means for scanning the various frequencies and error indicating means for each horse.

Thus, by analysing the electrical signals supplied by the measuring means placed, for example, on the back of each horse, the device according to the invention enables the monitoring by race stewards of the gait of each horse, for example during a trotting race.

In addition, this system enables the following in real time, for example by means of a visual display unit, of a change of gait and the recording of the progress of the race for each horse.

Figure 2:
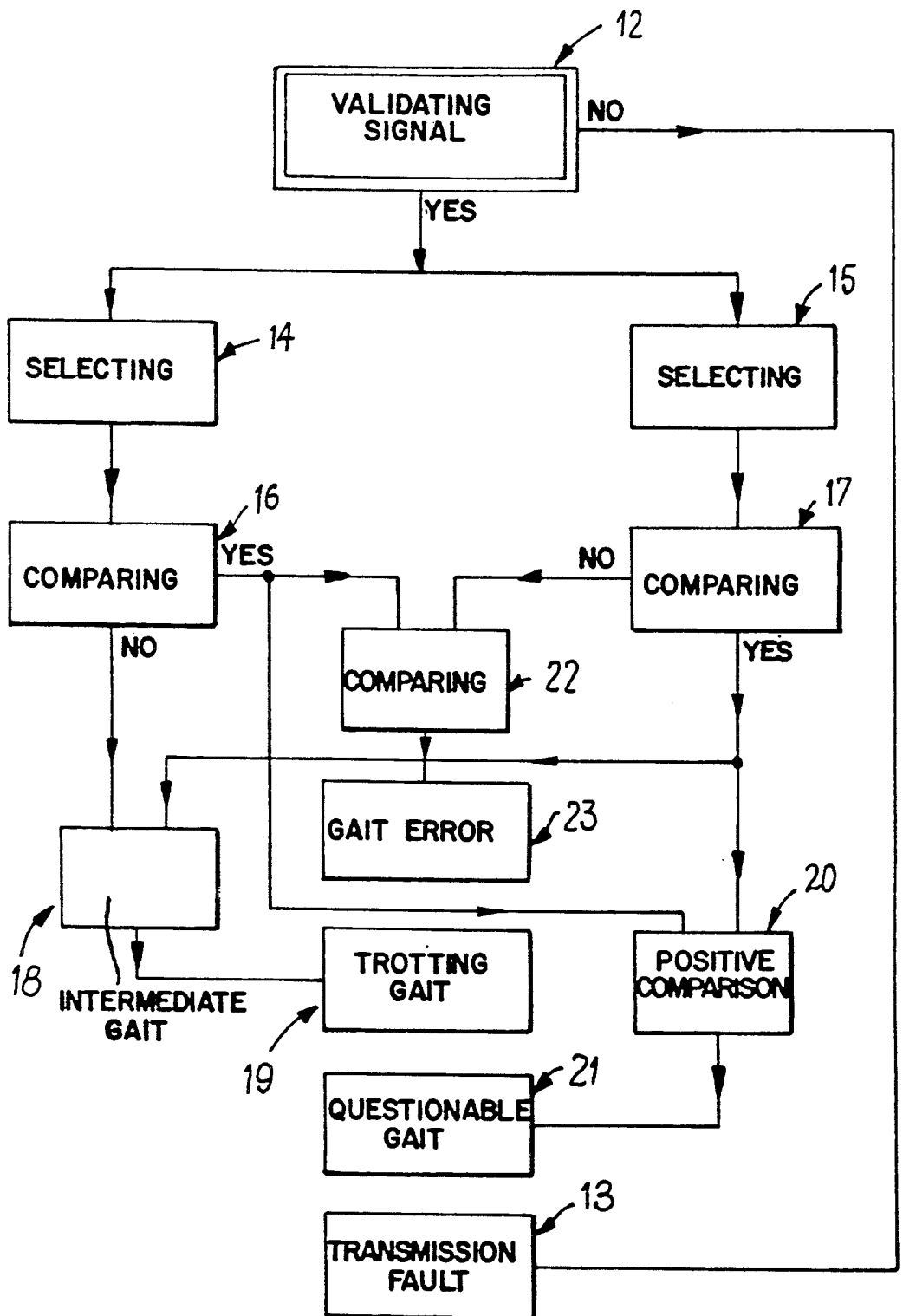

The invention will be better understood with the aid of the description which follows, given purely by way of example and with reference to the accompanying drawings, in which:

FIG. 1 shows a block diagram of a gait-monitoring device according to the invention; and FIG. 2 shows a flow chart illustrating the functioning of a monitoring device according to the invention.

As can be seen in FIG. 1, a device for monitoring the gait in particular of a horse, according to the invention, comprises a first unit 1 carried by a horse 2 and a second unit 3 separated from the first and arranged, for example, in a building close to a race-course or installed on board a motor vehicle following the latter.

The first unit comprises means for measuring displacement parameters of the horse along at least one axis.

These measuring means may consist, for example, of accelerometers, gyroscopes or other measuring means enabling the conversion of the movements of the horse into electrical signals. These means enable the measurement of the displacements of the horse along at least one axis, for example the vertical axis Z, but can also indicate the displacements of the horse along the three axes of an orthonormal reference system X, Y, Z.

The output of these measuring means is connected to the input of data processing means 5 which will be described in greater detail hereinbelow and the output of which is connected to means 6 for transmitting data to means 7 for receiving these data arranged in the second unit 3.

The output of these data receiving means is connected, on the one hand, to means 8 for processing the signals coming from these means, which will be described in greater detail hereinbelow, and, on the other hand, to means 9 for recording these data.

The output of these signal processing means 8 is connected to error-indicating means 10, placed at the disposal of race stewards for example.

As mentioned above, the first unit 1 can be carried by the horse, the electrical supply to this unit, necessary for the functioning of the various components thereof, being provided by independent supplying means 11 consisting, for example, of batteries, accumulators, solar-energy collectors or the like.

The data processing means 5 or 8, provided in the first and the second units 1 and 3 respectively, may possess means for selecting signals from a first frequency range of the parameters coming from the measuring means in order to determine a change of gait of the horse.

In fact, depending on the case, these selecting means may be arranged either in the processing means 5 of the unit 1, or in the processing means 8 of the unit 3.

Advantageously, the first frequency range ranges from 1.5 to 2.5 Hz.

These processing means 5 and 8 may also possess second means for selecting signals from a second frequency band, twice the first, that is to say ranging from 3 to 5 Hz.

In fact, the Applicant has observed that during a change of gait of a horse, for example when going from the trot to the gallop, the amplitude of the movements of the horse in a frequency band of between 1.5 and 2.5 Hz goes, for example, from a level 1 to a level 6 to 7 for movements along the axis Z of the horse.

During this change of gait, the amplitude of the excitations for the octave, that is to say for the frequency band between 3 and 5 Hz, is divided by two or three.

It is then possible by taking either of these data or by combining these two data to determine whether the horse is galloping or trotting.

This determination is performed, for example, by means of a microprocessor associated with the signal processing means 8 provided in the second unit 3, this microprocessor functioning according to the flow chart shown in FIG. 2.

The first functioning phase of this microprocessor is a phase 12 for validating a signal received, for example, via a query system performing, for example, a comparison between two successive receptions of signals emanating from the same transmitting means.

If the signal received is not validated, a transmission fault is determined at 13 and communicated, for example, to the race stewards.

If the signal received is validated, the latter is then transmitted to the inputs of two bandpass filters 14 and 15 respectively, the pass bands of which release the energy in the significant frequency band when the horse breaks into a gallop for the filter of order 1, 14, and of pass band ranging between 1.5 and 2.5 Hz, and in the significant frequency band when the horse is trotting for the filter of order 2, 15, and of pass band ranging between 3 and 5 Hz.

The signals coming from these filters 14 and 15 are then passed to comparing means 16 and 17 respectively. These signals are thus compared with values characterizing the gallop and the trot of a horse. These values are determined as mentioned above, i.e. the amplitude of the movements of the horse in a frequency band of between 1.5 and 2.5 Hz passes from a level 1 to a level 6 to 7, when the horse breaks into a gallop, for the movement along the axis Z of the latter, while the amplitude of the excitations for the octave, that is to say for the frequency band ranging between 3 and 5 Hz, is divided by 2 or 3.

At 18 there is an intermediate phase to ascertain whether the comparison at 16 is negative and whether the comparison at 17 is positive.

If this is the case, the horse is indeed trotting and a corresponding indication is given to the race stewards at 19.

On the other hand, at 20, if the results of the comparisons carried out at 16 and 17 are both positive, an indication of questionable gait is given to the stewards at 21.

At 22, an intermediate step is provided which makes it possible to determine that if the response to the comparison at 16 is positive and if the response to the comparison at 17 is negative, the horse is at fault, this fault being indicated to the race stewards at 23.

Thus, the validated signal received by the second unit 3 is filtered by the two bandpass filters 14 and 15, of pass band ranging from 1.5 to 2.5 Hz and from 3 to 5 Hz respectively, the first filter releasing the energy in the significant frequency band when the horse breaks into a gallop and the second, the significant frequency when the horse is trotting. The amplitude of the signals in each frequency band is then compared with a standard corresponding, in the case of the order 1 that is to say in the case of the filter 14, to the normal energy for a galloping horse and, in the case of the order 2, that is to say in the case of the filter 15, to the energy corresponding normally to the trot.

The comparators 16 and 17 thus indicate, in real time, the state of the energy in each frequency band relative to a standard.

The energy in each frequency band is then compared with a standard characterizing a specific gait, the results of these comparisons or their combination making it possible to determine the gait of the horse.

Before the start of each event, the various competitors receive a box containing the first unit 1, this box being fixed, for example, in the region of the withers of the horse to the harness of the latter.

Each horse, and hence more particularly each unit assigned to a horse, is then allocated a specific communication channel so that the various units carried by the various horses transmit at different frequencies. The gait of each horse is thus monitored by means of a device as has just been described, this device transmitting on a specific frequency assigned to a horse.

In this monitoring system, the second units associated with the first units carried by the horses can be grouped together in a common unit comprising means for scanning the various transmitting frequencies of the first units carried by the horses, these scanning means searching the various frequencies or data transmission channels successively in order to monitor all the horses during the race.

In this case too, the error-indicating means comprise error-indicating means for each horse so that the race stewards have at their disposal all the necessary data for making a decision on whether or not to relegate a horse.

It should be noted that the various data transmissions can be recorded in the recording means 9, which, in the event of a dispute, enables a check to be carried out.

Although, in the embodiment described, a device for monitoring the gait of a horse and more particularly for monitoring the breaking into a gallop of a horse normally running at a trot has been represented, other applications can be envisaged.

Thus, for example, the data concerning the other axes of displacement can be used to determine, for example, whether the horse shies.

Furthermore, this device may also be used for monitoring races other than horse races.

We claim:

1. Device for monitoring the gait of a horse to indicate if the horse has committed a gait error by changing its gait from trotting to galloping, comprising: measuring means (4) for measuring displacement parmaters of the horse (2) along at least one axis (Z), said measuring means producing an output signal having an amplitude corresponding to the measured parameters, processing means (5, 8) for processing the signals from the measuring means, comprising means (16, 17) for comparing the amplitude of the output signals from the processing means with at least one predetermined value which corresponds to an output signal characterizing a given gait of the horse, thereby to determine whether the horse is trotting or galloping and indicating means (10) for inidicating if the horse is trotting or galloping, said measuring means (4) being arranged in a first unit (1) carried by the horse (2) and additionally comprising independent means (11) for supplying electrical energy to the circuits of this first unit and means (6) for transmitting data to means (7) for receiving these data, provided in a second unit (3) separated from the first unit and in which the indicating means (10) are arranged.

2. Device according to claim 1, wherein the processing means (5, 8) comprises first selecting means (14) for selecting signals from a first frequency range of the parameters from the measuring means in order to determine a change of gait of the horse.

3. Device according to claim 1 or 2, wherein the said axis is a vertical axis (Z).

4. Device according to claim 2, wherein the first frequency range is from 1.5 to 2.5 $Hz_1$.

5. Device according to claim 2, wherein the processing means (5, 8) comprises second selecting means (15) for selecting signals from a frequency band, twice the first, of displacement parameters of the horse.

6. Device according to claim 5, wherein output signals from the first and second selecting means (14, 15) are passed to the inputs of the comparing means (16, 17) for comparing these signals with predetermined values corresponding to the gallop and the trot of the horse respectively, the outputs from these comparators then being processed in a data processing unit in order to determine a gait error of horse, a correct trotting gait (19) or a questionable gait (21) of the latter as a function of the result of the comparing means.

7. Device according to claim 1, wherein processing means arranged in the first unit (1).

8. Device according to claim 1, wherein the comparing means (16, 17) are arranged in the second unit (3).

9. Device according to claim 1, 7 or 8, wherein the second unit (3) comprises means (9) for recording the data, connected to the output of the receiving means (7).

10. System for monitoring the gait of horses during a trotting race wherein the gait of each horse is monitored by means of a device according to claim 1, and wherein each device transmits its data on a separate frequency.

11. System according to claim 10, wherein the second units of each of the devices are grouped together in a common unit comprising means for scanning the various frequencies and error-indicating means for each horse.

* * * * *